United States Patent [19]

Alexander

[11] Patent Number: 4,919,249

[45] Date of Patent: Apr. 24, 1990

[54] MULTIPLE SECTION CHUTE RESTRICTOR

[75] Inventor: Dennis W. Alexander, Oak Creek, Wis.

[73] Assignee: Rexworks Inc., Milwaukee, Wis.

[21] Appl. No.: 344,071

[22] Filed: Apr. 17, 1989

[51] Int. Cl.[5] .............. B65G 11/14

[52] U.S. Cl. .............. 193/6; 193/23

[58] Field of Search .............. 193/4–6, 193/2 A, 10, 14, 23, 29; 414/468, 501, 523; 366/44, 68

[56] References Cited

U.S. PATENT DOCUMENTS 3,456,769 7/1969 Prichard et al. .............. 193/4

3,542,179 11/1970 Prichard .............. 193/5

3,774,741 11/1973 Johnson .............. 193/6

4,498,568 2/1985 Christenson .............. 193/23

*Primary Examiner*—Joseph E. Valenza

*Attorney, Agent, or Firm*—George A. Evans, Sr.

[57] ABSTRACT

One of the hinges between sections of the distributing chute of a concrete mixer is provided with a stop which prevents abutment of chute section and the corresponding possibility of injury to hands of a workman engaged in unhinging the chute sections. One of the sections also has a cam which restores the abutment to a safety position when the sections are unhinged and folded back into transporting position.

7 Claims, 2 Drawing Sheets

FIG. 1.
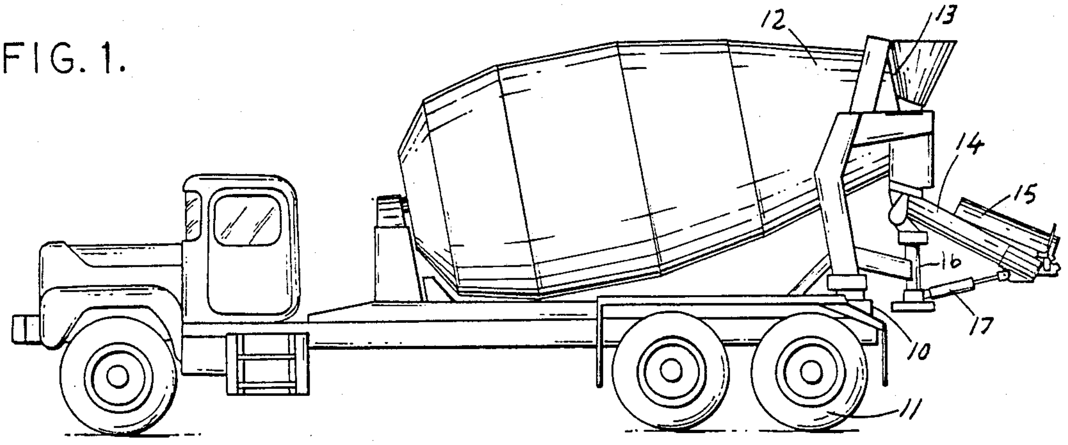
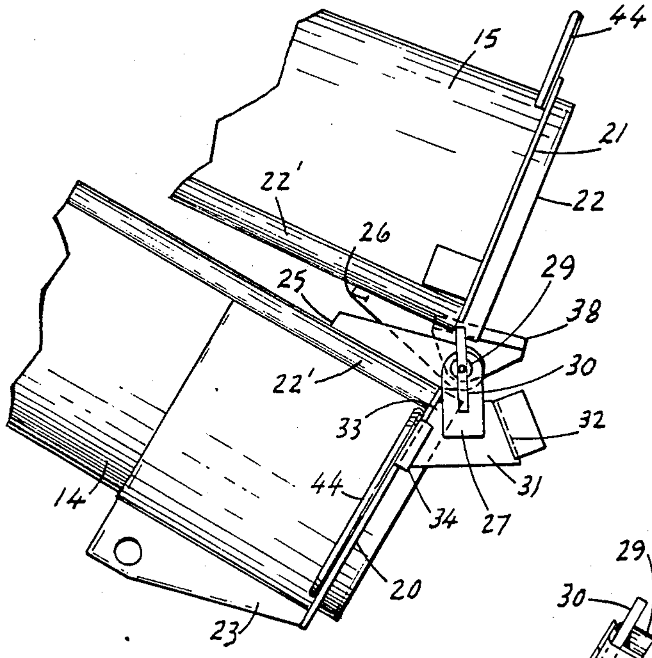
FIG. 2.
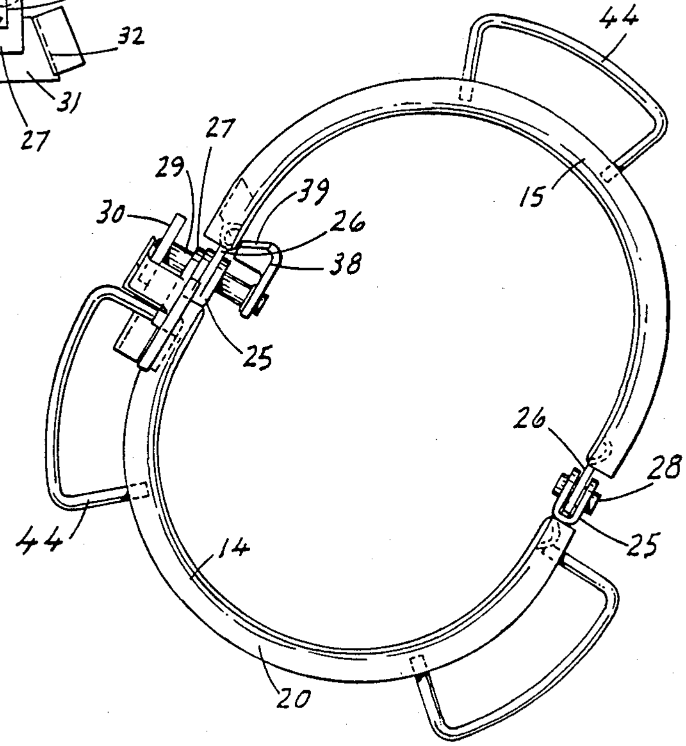
FIG. 3.

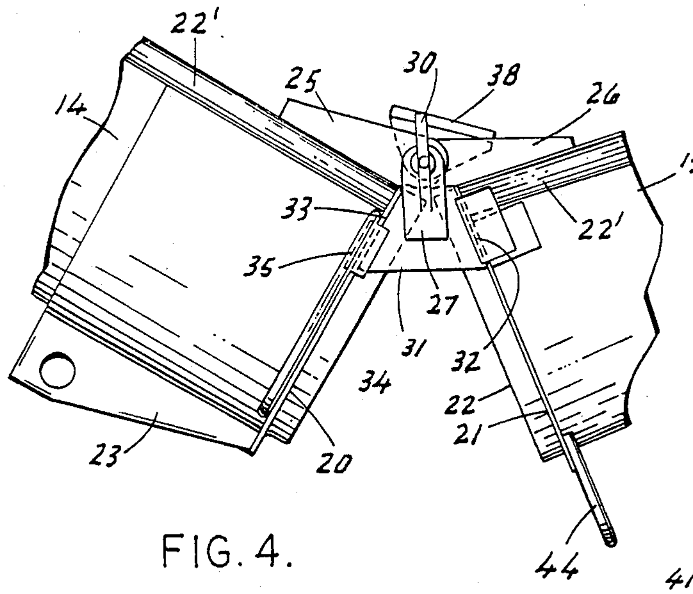
FIG. 4.
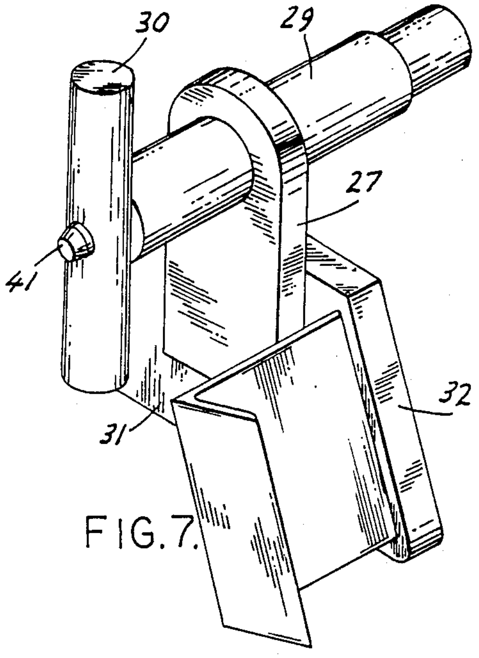
FIG. 7.
FIG. 5.
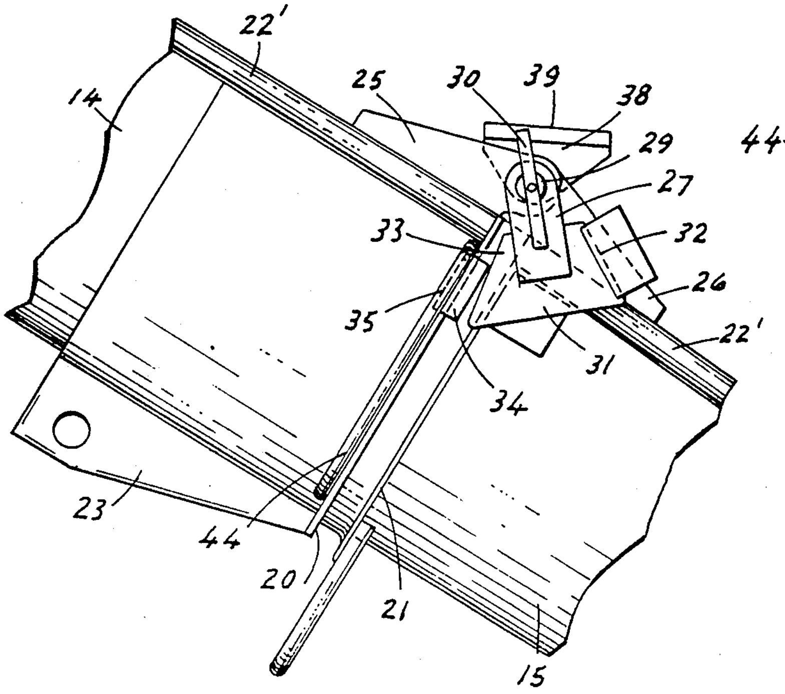
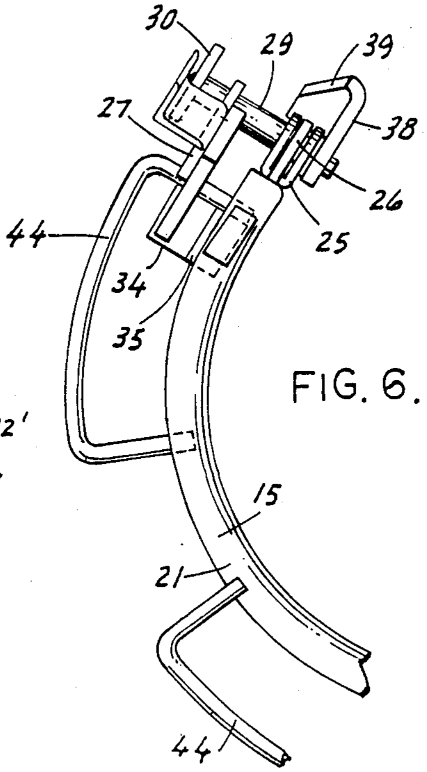
FIG. 6.

MULTIPLE SECTION CHUTE RESTRICTOR

The present invention relates to delivery chutes (frequently called spouts) which are generally mounted in an inclined position so that material deposited at the higher end may slide down the chute and be discharged at its lower end. Such chutes are commonly made in sections which are hinged together so that the outer section may be aligned with the inner section during discharge of material and then be folded back on the inner section so as to reduce the length of the chute appended to a hauling vehicle or the like.

Such chutes are provided on transit concrete mixers with the inner end disposed beneath the discharge end of the mixer drum and the outer end spaced a considerable distance to the place where the concrete is being poured. The present invention is not concerned with the mounting of the inner end of the chute on the frame of the mixer where it may be swung laterally about a verital pivot, but it deals with the hinge between the outer end of the inner section and the inner end of the outer section.

It is a usual procedure for a workman to stand near the outer end of the chute with the sections in folded-back position and to swing the chute around its inner pivot into a direction where it is desired to pour the concrete. In order to extend the chute to its desired limit, the flip-over, outer section is pulled back over a vertical position and allowed to drop until its inner end abuts the outer end of the inner chute section. What has happened with a rather unusual frequency are injuries to the fingers of workmen which are pinched between the sections as they impinge or bang together.

One of the causes of such accidents is the fact that one workman may be holding the outer end of the inner sections and another workman, desiring to be of help, lifts the outer end of the sections to cause it to pass through its vertical position from which it can be dropped permitting it to swing into final operation position. Because of its weight and the distance through which it falls, anything in the way is struck a serious blow.

According to the present invention, one of the hinges which connect the two sections is provided with a device which restricts the pivotal movements of the outer section causing it to stop before the abutting sections come into abutment. The restriction can then be moved so the outer end may reach its final abutting position.

The invention also provides means to restore the restrictor to stop its safety position as the outer section of the chute is folded back into its stored or overlapping position.

The invention also resides in the simplicity of its construction and the ease with which it may be installed on equipment already in service.

The foregoing and other advantages will become apparent upon examination of the description and the drawings contained herein, wherein:

FIG. 1. is a side elevation of the rear portion of a transit concrete mixer showing a distributing chute of the type to which the present invention pertains;

FIG. 2. is an enlarged side elevation of the connection between the two chute sections with the sections in overlapping position;

FIG. 3. is an end view of the structure shown in FIG. 2;

FIG. 4. is a view similiar to FIG. 2 showing the outer chute moved to a position abutting the restriction;

FIG. 5. is a view similiar to FIG. 4 with the two end portions of the chute section abutting each other;

FIG. 6. is an end view of a portion of the elements when in the position shown in FIG. 5; and FIG. 7. is an isometric view of the restrictor element showing it mounted on the hinge pin.

As previously described, the distribution chute of the present invention may be used with transit concrete mixers which provide concrete mixed in transit and delivered at a construction site. Referring to FIG. 1, the mixer frame 10 is supported on wheels and carries a drum 12 having an elevated rear opening 13 through which mixed concrete is discharged onto the delivery chute.

The chute shown is made of two sections, an inner section 14 and an outer section 15 shown in overlapping or folded-back position. The sections are hinged together with hinge pins 28 and 29 located at the upper adjacent ends of the trough-like chute sections. In order to swing the chute about an arc extending beneath the discharge end of the mixer drum, the inner end of the inner section 14 is mounted on a vertical pivot 16. The outer end of said section is supported by a strut 17 which is hydraulically lengthened or shortened to adjust the elevation of the outer end of the section.

The two adjoining portions of the chute are provided with stiffening flanges 20 and 21, flange 20 on the inner chute section being arranged to abut the inner end 22 of the outer section when the sections are aligned. In this position the outer end slightly overlaps the inner section to provide a better seal.

The outer longitudinal edge of each of the chute sections are provided with the flanges 22' which stiffen and help to prevent deformation of the members. Bracket 23 is arranged to connect to the outer end of the strut 17 and handles 44 (see FIG. 3) enable the workmen to manipulate the chute sections and to position them as desired.

Referring again to FIG. 3, the hinge on each side of the hinge sections are basically the same, with a U shaped channel 25 mounted on the upper edges of the end portion or the inner section. Hinge section 26 is mounted on the adjacent edge of the inner end of the outer section and extends between the flanges of the channels 25. The hinge is completed by the pins 28 and 29 which extend through aligned openings provided in the hinge sections.

The difference between the hinge on the right side of the chute sections, as shown in FIG. 3, and the hinge on the left side of the view is that the pin designated 29, on the left is made longer and has secured thereto the different elements that provide the features of this invention.

Mounted on the outer end of the pin 29 is a handle 30 by which the pin can be moved in an axial direction to the different positions shown in FIGS. 3 and 6. Extending from the outer portion of the pin 29 is a finger 27 attached to which is the plate 31. Plate 31 is four sided with inwardly converging faces 32 and 33 on opposite edges of the plate. These faces are arranged so that when the pin 29 is in a retracted position, they served as stops with the face 33 abutting the stiffening flange 20 on the inner chute section 14. While in this same position, the face 32 is in position to be engaged by the stiffening flange 21 on the outer chute section 15 when the latter is moving into position of alignment with the inner chute section 14.

As shown in FIG. 4, with the plate 31 in abutment with the chute sections, a gap is provided between the lower portion of each section so that they would not pinch a person's hand or fingers if inadvertently disposed therebetween. By pulling backwards on the handle 30 the plate 31 no longer engages the stiffening flanges 20 and 21 and the outer chute section 15 can pivot into full abutting relation with the inner chute. Stop 34 is attached to 35 as shown and prevents pin 29 and plate 31 from jumping out of the restricted position when outer chute 15 is dropped to the position shown in FIG. 4.

To make it easier to withdraw the pin 29 and plate 31, and also to enable the plate to avoid striking the block 34, the outer end of the chute 15 can be lifted slightly and the handle 30 rotated a slight amount in a counter clockwise direction so that the face 33 makes only line contact with the stop 34, as shown in FIG. 5. The pin may then be moved outwardly with considerably less friction than if the face 33 made contact with the entire surface of the stop 34.

After the chute sections have served their purpose for distributing the concrete from the mixer drum, the outer section will normally be folded back on the inner chute and the two chute sections will be swung around the hinge 16 at the rear of the mixer so they are crosswise of the mixer during return travel of the truck.

A primary feature of the invention is provision of means to restore the plate 31 to its original operating position when the outer section has been moved to overlapping position. This is accomplished by the provision of the cam 38 which is secured to the inner end of pin 29 by welding or otherwise.

The upper end of the cam 38 has a cam face 39 which engages the inner surface of the flange 22′ on the upper edge of the outer chute section 15 as the latter is being lifted to flip-over position. Further movement of the outer section pushes the pin 29 into retracted position with the plate 31 returned to where it will block any subsequent attempt to drop the outer section into full abutment with the inner sections.

To make it easier to slide the pin 29 axially in the hinge sections 25 and 26, a grease fitting 41 is provided at the outer end of the pin 29 communicating with passages inside the pin so that grease can be supplied to the joint. The handles 44 on the outer sides of the sections enable easier manipulation of the chute section.

The invention having been described, what is claimed is:

1. Apparatus for preventing hinged sections of a chute from abutting each other when the sections are aligned, comprising a set of hinges connecting the sections, a plate mounted on one of the hinges arranged when in operative position to prevent such abutment, means for moving said plate to an inoperative position enabling such abutment and cam means on said hinge arranged to restore the plate to its original position when the sections are folded out of an aligned position.

2. Apparatus as set forth in claim 1, including a hinge pin free to move axially in one of said hinges, said plate being fixedly mounted on said pin, and said means for moving said pin moves it in an axial direction to cause said plate to be clear of abutment between said sections.

3. Apparatus as set forth in claim 2, wherein said pin is free to rotate in said hinge enabling said plate to be rocked in the hinge to enable easier movement of the pin in an axial direction.

4. Apparatus as set forth in claim 2, wherein one of said sections is stationary while the other section rotates in the hinge, and includes a cam member rigidly mounted on said pin having a cam face engageable with a portion of the stationary section of the chute, whereby rotation of said section causes the pin to move axially to restore the plate to abutting postion between said sections.

5. Apparatus as set forth in claim 4, wherein said pin extends on either side of said hinge, said plate being mounted in the outer portion of said pin and said cam face being mounted on the inner portion of the pin.

6. A restrictor for a trough-shaped chute having two hinged sections arranged so that in one position the sections are aligned and in another position the outer section is folded back over the inner section, one of the hinges connecting the sections including a hinge pin which is slideable in an axial direction, a restrictor plate mounted on said pin, said plate having faces engaging portions of each section when the sections approach impingement with each other, means for moving said pin so that the faces no longer maintain seperation of the sections, whereby they may impinge, and means mounted on said pin to move the pin axially to restore the plate to its original postion to prevent the sections from impinging each other during subsequent repositioning of the sections.

7. Apparatus according to claim 6, wherein said means to move said pin to restore said plate includes a cam mounted on said pin engageable with the inner section of the chute to cause restoration position.

* * * * *